United States Patent Office 2,872,695
Patented Feb. 10, 1959

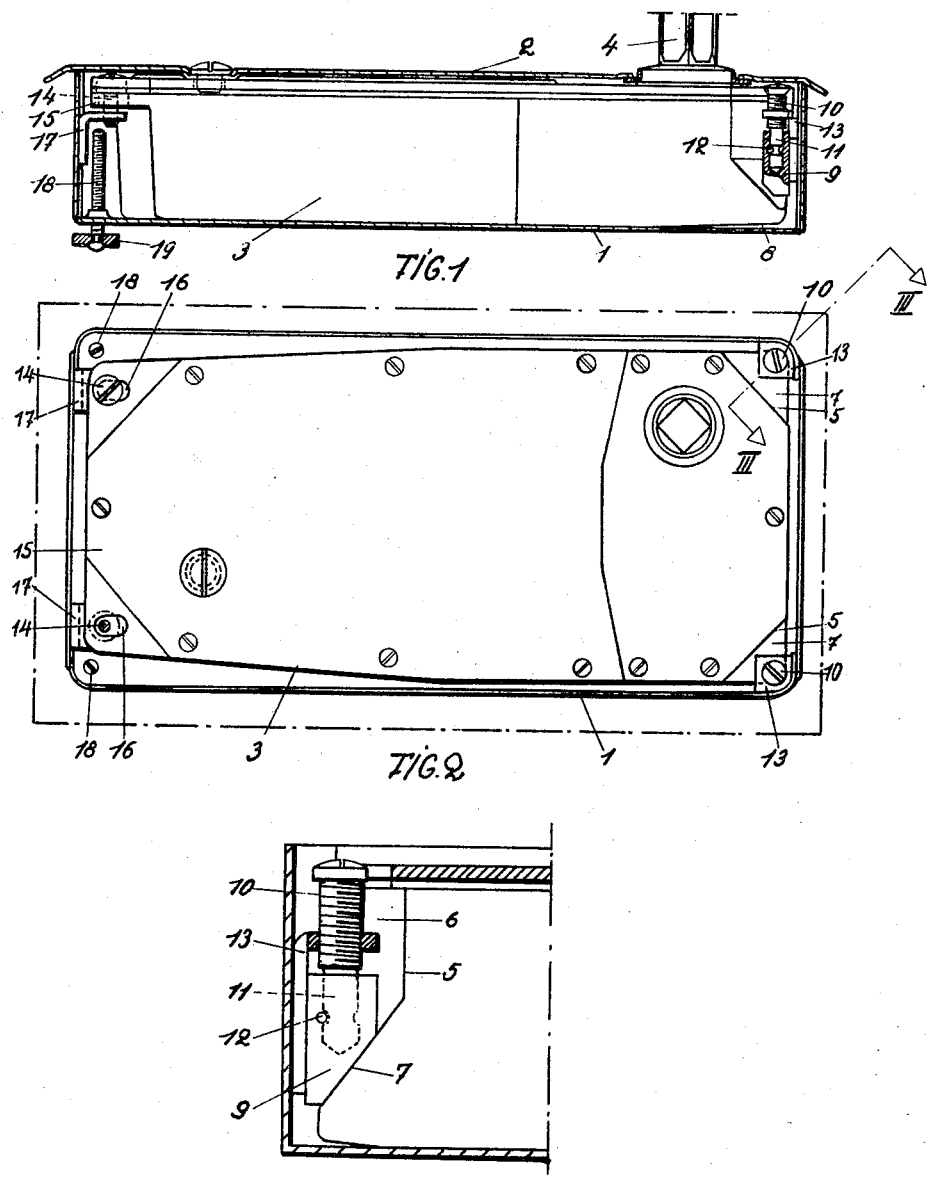

2,872,695
ADJUSTABLE DOOR CLOSER

Reinhold Voester, Stuttgart-Degerloch, Walter Voester, Stuttgart, and Wolfgang Schmid, Stuttgart-Feuerbach, Germany, assignors to Vereinigte Baubeschlagfabriken Gretsch & Co., Stuttgart-Feuerbach, Germany Application June 19, 1957, Serial No. 666,685

Claims priority, application Germany June 21, 1956

9 Claims. (Cl. 16—55)

The present invention relates to devices such as door closers and the like and in particular to structure for rendering such devices adjustable.

One of the objects of the present invention is to provide an adjustable door closer or the like which can be adjusted after it is installed. Thus, in the case of a door closer, it is an object of the present invention to render such a door closer easily adjustable even after the door is installed so that a shaft of the door closer may be placed in its proper position.

Another object of the present invention is to provide an adjustable device of the above type wherein adjustments may be quickly and easily carried out in different directions.

A further object of the present invention is to provide an adjustable device of the above type with a means for regulating the position of the entire device, even after it is installed.

With the above objects in view, the present invention mainly consists of an adjustable door closer or the like which includes an outer casing having a plurality of side walls extending from an end wall thereof and provided with a pair of corners respectively located at the ends of one of its side walls. An inner casing which is smaller than the outer casing is located within the latter for adjustable shifting movement therein, and this inner casing has an end wall engaging the end wall of the outer casing. The inner casing also has a side wall directed toward the above side wall of the outer casing which is provided with the two corners at its ends, and this inner casing respectively has at the ends of its side wall a pair of outer faces respectively directed away from the end walls of the casings and respectively inclined from the ends of the above side wall of the inner casing away from the end wall thereof and toward the center of the inner casing. A pair of adjusting members are located respectively adjacent the above corners of the outer casing in the latter and have respectively a pair of faces of the same inclination as the faces of the inner casing directed toward the latter faces, respectively. A manually operable means cooperates with the adjusting members for shifting the same toward or away from the end wall of the outer casing so as to shift the inner casing within the outer casing or to free the inner casing for shifting movement in the outer casing. A means is carried by the outer casing and cooperates with the inner casing for fixing the latter in an adjusted position within the outer casing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

Fig. 1 is a longitudinal elevational view of an adjustable device according to the present invention, Fig. 1 showing an outer casing of the device in section;

Fig. 2 is a top plan view of the device of Fig. 1 with the top wall of the latter removed; and Fig. 3 is a fragmentary elevation view taken in a plane on line III—III passing diagonally through one of the right corners of the structure of Fig. 2 and showing the outer casing and part of an adjusting structure in section.

Referring now to the drawing, an adjustable door closing structure is illustrated therein, and this structure includes an outer casing 1 made of sheet metal, for example. This outer casing is set into a floor or lintel and is closed by a cover plate 2.

An inner casing 3 which is smaller than the outer casing 1 is located within the latter for adjustable shifting movement therein, and in the position of the parts shown in Fig. 1 the bottom end wall of the inner casing 3 engages the bottom end wall of the outer casing 1. The inner casing 3 is open at its top and houses in its interior an unillustrated known door closing and checking device which is in driving engagement with the shaft 4 which is suitably connected to a door for closing the same automatically after it is opened. It will be noted that the outer casing 1 has a plurality of side walls extending upwardly from its bottom wall and that the inner casing 3 has a right side wall, as viewed in Figs. 1 and 2, opposite the right side wall of the outer casing 1.

At the ends of this right side wall, as viewed in Figs. 1 and 2, the inner casing 3 has a pair of wall portions 5 which are respectively located in planes substantially normal to the bottom end walls of the casings 1 and 3 and bisecting the corners of the outer casing 1 which are located at the ends of the right side wall thereof, as viewed in Figs. 1 and 2. At the ends of this right side wall, as viewed in Figs. 1 and 2, the inner casing 3 is provided with a pair of wall portions having outer faces 7 directed away from the bottom end walls of the casings and inclined from the ends of the right side wall of the inner casing 3 away from the bottom end wall of the casing toward the center thereof, and these faces 7 join the wall portions 5, respectively, at the edges of the faces 7 which are more distant from the bottom end wall of the casing 3.

A pair of adjusting members 9 are respectively located within the outer casing 1 adjacent the corners respectively located at the ends of the right side wall thereof, as viewed in Figs. 1 and 2, and these adjusting members 9 respectively have inclined faces of the same inclination as the faces 7 and respectively opposite the same.

A manually operable adjusting means is provided for shifting the adjusting members 9 toward and away from the bottom end walls of the casings 1 and 3, and this manually operable adjusting means includes a pair of screw members 10 respectively having bottom cylindrical portions 11 extending turnably into bores of the adjusting members 9, respectively. The cylindrical portions 11 of the screw members 10 are formed with annular grooves, and each of the adjusting members 9 carries a pin 12 which extends into the groove of the screw member so that in this way a means is provided for connecting the screw members respectively to the members 9 for turning movement with respect thereto while preventing axial movement of the screw members 10 with respect to the adjusting members 9.

The screw members 10 respectively extend threadedly through threaded bores of a pair of projections located at the corners of the outer casing 1 in the interior thereof respectively at the ends of the right sided wall thereof, as viewed in Figs. 1 and 2. These projections are carried by a pair of guide members 13 which are fixed to the inner surface of the outer casing 1 respectively at the said corners thereof, and these guide members 13 are channel-shaped. Each of the guide members 13 has a pair of longitudinal legs joined to each other at an angle and respectively slidably engaging a pair of adjacent side surfaces of an adjusting member 9, so that in this way the guide members 13 respectively guide the adjusting members 9 for vertical movement, as viewed in the drawing, while at the same time preventing turning of the adjusting members 9.

At the side of the device distant from the shaft 4 a means is provided for releasably fixing the inner casing 3 in an adjusted position within the outer casing 1, and this means includes a pair of screw members 14 having shanks which respectively extend with considerable clearance through a pair of elongated slots 16 formed in a flange 15 at the left end of the inner casing 3, as viewed in Figs. 1 and 2. The left side wall of the casing 1, as viewed in Figs. 1 and 2, fixedly carries in the interior of the casing 1 a pair of support members 17 for the screws 14, respectively, these support members 17 having portions projecting from the left side wall of the casing 1 and respectively formed with threaded bores which respectively threadedly receive the screws 14, the heads of the latter respectively being wider than the slots 16 and located thereover, as viewed in Fig. 1.

It will be noted from Fig. 2 that the inner casing 3 tapers toward its left end, as viewed in Fig. 2, this left end of the casing 3 being shorter than the right side wall thereof. In this way the casing 3 defines with the casing 1 a pair of gaps. A pair of adjusting screws 18 are threadedly carried by the bottom end wall of the outer casing 1 and respectively extend into these gaps, each of these screws 18 carrying a disc 19 at its bottom end which is located at the exterior of the casing 1, as viewed in Fig. 1.

It will be noted that the ends of the screw members 18 which are accessible within the interior of the casing 1 are provided with slots to receive a blade of a screwdriver. Furthermore, the right end 8 of the bottom end wall of the inner casing 3 is inclined with respect to the bottom wall of the casing 1, as is apparent from Fig. 1. Also, Fig. 3 shows the space 6 at one of the right corners of the outer casing 1, as viewed in Figs. 1 and 2, in which the above-described adjusting structure is located. The casing 3 is closed with any suitable top wall fastened to the casing 3 by the screws whose heads are visible in Fig. 1, and the cover 2 is fixed directly to this top wall of the casing 3 by a suitable screw member, as shown in Fig. 1, this screw member being shown in top plan view in Fig. 2. It will be noted that the cover 2 has an opening through which the shaft 4 passes.

When an adjustment is to be made the cover 2 is removed. By turning the screw members 10 the pressure of the adjusting members 9 on the faces 7 of the housing 3 can be increased or decreased. Before shifting the housing 3 the screws 14 are first loosened, and after such loosening of the screws 14 the housing 3 can be shifted longitudinally or transversely upon turning of the screws 10. With the screw members 14 loosened the screw members 10 may be turned so as to press the adjusting members 9 against the faces 7 and this will cause the housing 3 to be shifted to the left, as viewed in Figs. 1 and 2. In order to shift the housing 3 to the right, the screw members 10 are turned so as to raise the members 9 from the faces 7 and then with a suitable screwdriver located in the gap between the left end of the inner casing 3 and the left side wall of the casing 1, the housing 3 may be shifted to the right until its faces 7 again engage the mating faces of the adjusting members 9. In order to shift the housing 3 transversely within the housing 1, after the screw members 14 are loosened, a screwdriver inserted in the gap between the left end of casing 3 and the left side wall of outer casing 1 may be used to hold the faces 7 in engagement with the members 9, and then one of the screw members 10 may be loosened to withdraw its adjusting member 9 from engagement with the opposed face 7 while the other is turned so as to press its adjusting member 9 toward the cooperating face 7, and in this way the inner casing 3 can be shifted laterally in one direction or the other. Once the adjusted position of the crank 4 is obtained by this shifting of the inner casing 3 and with the faces 7 of casing 3 in engagement with the adjusting members 9, the screw members 14 are tightened so as to releasably fix the casing 3 in its adjusted position, and the screw members 10 are also turned at this time so as to press the adjusting members 9 against the faces 7.

Fig. 2 diagrammatically shows in dot-dash lines a recess in a floor or lintel in which the adjustable device of the invention is located, and the bottom ends of the screw members 18, and in particular the discs 19 thereof, engage the base of this recess so that by turning the screw members 18 the position of the entire device can be regulated.

It will be understood that each of the elements described above, or two or more together, may also find a useful application in other types of adjustable devices differing from the types described above.

While the invention has been illustrated and described as embodied in an adjustable door closer, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in an adjustable door closer or the like, in combination, an outer casing having a plurality of side walls extending from an end wall of said outer casing and having a pair of corners located at the ends of one of said side walls; an inner casing smaller than and located within said outer casing for adjustable shifting movement therein, said inner casing having an end wall engaging said end wall of said outer casing and a side wall opposite said one side wall of said outer casing, said inner casing having at the ends of said side wall thereof respectively a pair of outer faces directed away from said end walls and respectively inclined from said ends of said inner casing side wall away from said end walls and toward the center of said inner casing; a pair of adjusting members located respectively adjacent said corners of said outer casing and within the latter and respectively having a pair of faces of the same inclination as said inner casing faces and opposite the latter faces; manually operable means carried by said outer casing and cooperating with said adjusting members for shifting the same toward or away from said end wall of said outer casing so that said inner casing will be shifted within said outer casing by engagement of said face of either of said adjusting members with the opposed face of the inner casing while the other adjusting member is disengaged from the other opposed face of the inner casing or freed for movement within said outer casing by disengagement of said faces of said adjusting members with respect to said faces of said inner casing; and means carried by said outer casing and cooperating with said inner casing for releasably fixing the same in an adjusted position within said outer casing.

2. For use in an adjustable door closer or the like, in combination, an outer casing having a plurality of side walls extending from an end wall of said outer casing and having a pair of corners located at the ends of one of said side walls; an inner casing smaller than and located within said outer casing for adjustable shifting movement therein, said inner casing having an end wall engaging said end wall of said outer casing and a side wall opposite said one side wall of said outer casing, said inner casing having at the ends of said side wall thereof respectively a pair of outer faces directed away from said end walls and respectively inclined from said ends of said inner casing side wall away from said end walls and toward the center of said inner casing, said inner casing having a pair of wall portions respectively extending from the edges of said faces thereof more distant from said end wall thereof in a direction away from said end walls respectively in planes substantially normal to said end walls and said wall portions having outer surfaces respectively directed toward said corners of said outer casing; a pair of adjusting members located respectively adjacent said corners of said outer casing in the latter and respectively having a pair of faces of the same inclination as said inner casing faces directed toward the latter faces; manually operable means carried by said outer casing and cooperating with said adjusting members for shifting the same toward or away from said end wall of said outer casing so that said inner casing will be shifted within said outer casing by engagement of said face of either of said adjusting members with the opposed face of the inner casing while the other adjusting member is disengaged from the other opposed face of the inner casing or freed for movement within said outer casing by disengagement of said faces of said adjusting members with respect to said faces of said inner casing; and means carried by said outer casing and cooperating with said inner casing for releasably fixing the same in an adjusted position within said outer casing.

3. For use in an adjustable door closer or the like, in combination, an outer casing having a plurality of side walls extending from an end wall of said outer casing and having a pair of corners located at the ends of one of said side walls; an inner casing smaller than and located within said outer casing for adjustable shifting movement therein, said inner casing having an end wall engaging said end wall of said outer casing and a side wall opposite said one side wall of said outer casing, said inner casing having at the ends of said side wall thereof respectively a pair of outer faces directed away from said end walls and respectively inclined from said ends of said inner casing side wall away from said end walls and toward the center of said inner casing; a pair of adjusting members located respectively adjacent said corners of said outer casing and within the latter and respectively having a pair of faces of the same inclination as said inner casing faces and opposite the latter faces; a pair of projections respectively located at said corners of said outer casing in the interior of the latter and respectively formed with a threaded bore passing therethrough; a pair of manually turnable screw members extending threadedly through said bores of said projections and respectively having their axes substantially normal to said end wall of said outer casing, said screw members being connected to said adjusting members, respectively, so that when said screw members are turned said adjusting members will be moved toward or away from said end wall of said outer casing for respectively engaging or disengaging said inclined faces of the inner casing; and means carried by said outer casing and cooperating with said inner casing for fixing the same in an adjusted position within said outer casing.

4. For use in an adjustable door closer or the like, in combination, an outer casing having a plurality of side walls extending from an end wall of said outer casing and having a pair of corners located at the ends of one of said side walls; an inner casing smaller than and located within said outer casing for adjustable shifting movement therein, said inner casing having an end wall engaging said end wall of said outer casing and a side wall opposite said one side wall of said outer casing, said inner casing having at the ends of said side wall thereof respectively a pair of outer faces directed away from said end walls and respectively inclined from said ends of said inner casing side wall away from said end walls and toward the center of said inner casing; a pair of adjusting members located respectively adjacent said corners of said outer casing and within the latter and respectively having a pair of faces of the same inclination as said inner casing faces and opposite the latter faces; a pair of projections respectively located at said corners of said outer casing in the interior of the latter and respectively formed with a threaded bore passing therethrough; a pair of manually turnable screw members extending threadedly through said bores of said projections and respectively having their axes substantially normal to said end wall of said outer casing, said screw members being connected to said adjusting members, respectively, so that when said screw members are turned said adjusting members will be moved toward or away from said end wall of said outer casing for respectively engaging or disengaging said inclined faces of the inner casing; means carried by said outer casing and cooperating with said inner casing for releasably fixing the same in an adjusted position within said outer casing; and a pair of guide members respectively located in said outer casing at said corners thereof for guiding said adjusting members for shifting movement toward and away from said end wall of said outer casing.

5. For use in an adjustable door closer or the like, in combination, an outer casing having a plurality of side walls extending from an end wall of said outer casing and having a pair of corners located at the ends of one of said side walls; an inner casing smaller than and located within said outer casing for adjustable shifting movement therein, said inner casing having an end wall engaging said end wall of said outer casing and a side wall opposite said one side wall of said outer casing, said inner casing having at the ends of said side wall thereof respectively a pair of outer faces directed away from said end walls and respectively inclined from said ends of said inner casing side wall away from said end walls and toward the center of said inner casing; a pair of adjusting members located respectively adjacent said corners of said outer casing and within the latter and respectively having a pair of faces of the same inclination as said inner casing faces and opposite the latter faces; a pair of projections respectively located at said corners of said outer casing in the interior of the latter and respectively formed with a threaded bore passing therethrough; a pair of manually turnable screw members extending threadedly through said bores of said projections and respectively having their axes substantially normal to said end wall of said outer casing, said screw members being connected to said adjusting members, respectively, so that when said screw members are turned said adjusting members will be moved toward or away from said end wall of said outer casing for respectively engaging or disengaging said inclined faces of the inner casing; means carried by said outer casing and cooperating with said inner casing for releasably fixing the same in an adjusted position within said outer casing; and a pair of guide members respectively located in said outer casing at said corners thereof for guiding said adjusting members for shifting movement toward and away from said end wall of said outer casing, said guide members respectively carrying said projections.

6. For use in an adjustable door closer or the like, in combination, an outer casing having a plurality of side walls extending from an end wall of said outer casing and having a pair of corners located at the ends of one of said side walls; an inner casing smaller than and located within said outer casing for adjustable shifting movement therein, said inner casing having an end wall engaging said end wall of said outer casing and a side wall opposite said one side wall of said outer casing, said inner casing having at the ends of said side wall thereof respectively a pair of outer faces directed away from said end walls and respectively inclined from said ends of said inner casing side wall away from said end walls and toward the center of said inner casing; a pair of adjusting members located respectively adjacent said corners of said outer casing and within the latter and respectively having a pair of faces of the same inclination as said inner casing faces and opposite the latter faces; a pair of projections located in said outer casing at said corners thereof and respectively formed with a threaded bore; a pair of screw members respectively extending threadedly through said bores of said projections and respectively having axes substantially normal to said end wall of said outer casing; means connecting said screw members respectively to said adjusting members for turning movement with respect thereto while preventing axial movement of said screw members respectively with respect to said adjusting members, whereby when said screw members are turned said adjusting members will be shifted toward and away from said end wall of said outer casing for respectively engaging or disengaging said inclined inner casing faces; and means carried by said outer casing and cooperating with said inner casing for fixing the same in an adjusted position within said outer casing.

7. For use in an adjustable door closer or the like, in combination, an outer casing having a plurality of side walls extending from an end wall of said outer casing and having a pair of corners located at the ends of one of said side walls; an inner casing smaller than and located within said outer casing for adjustable shifting movement therein, said inner casing having an end wall engaging said end wall of said outer casing and a side wall opposite said one side wall of said outer casing, said inner casing having at the ends of said side wall thereof respectively a pair of outer faces directed away from said end walls and respectively inclined from said ends of said inner casing side wall away from said end walls and toward the center of said inner casing, said inner casing defining a pair of gaps within said outer casing; a pair of screw members threadedly carried by said outer casing, extending into said gaps, and located in part at the exterior of said outer casing so that said screw members may be turned for regulating the position of said outer casing; a pair of adjusting members located respectively adjacent said corners of said outer casing in the latter and respectively having a pair of faces of the same inclination as said inner casing faces directed toward the latter faces; manually operable means carried by said outer casing and cooperating with said adjusting members for shifting the same toward or away from said end wall of said outer casing so that said inner casing will be shifted within said outer casing by engagement of said face of either of said adjusting members with the opposed face of the inner casing while the other adjusting member is disengaged from the other opposed face of the inner casing or freed for movement within said outer casing by disengagement of said faces of said adjusting members with respect to said faces of said inner casing; and means carried by said outer casing and cooperating with said inner casing for releasably fixing the same in an adjusted position within said outer casing.

8. In an adjustable door closer, in combination, an outer casing having a plurality of side walls extending from an end wall thereof and having a pair of corners respectively located at the ends of one of said side walls; an inner casing carrying a door closing shaft, said inner casing being smaller than and located within said outer casing for adjustable shifting movement therein and said inner casing having an end wall engaging said end wall of said outer casing and a side wall opposite said one side wall of said outer casing and located adjacent to said shaft, said inner casing respectively having at the ends of said side wall thereof a pair of outer faces respectively directed away from said end walls and respectively inclined from said ends of said inner casing side wall away from said end wall thereof and toward the center of said inner casing; a pair of adjusting members located respectively adjacent said corners of said outer casing and within the latter and respectively having a pair of faces of the same inclination as said inner casing faces opposite the latter faces; manually operable means carried by said outer casing and cooperating with said adjusting members for shifting the same toward or away from said end wall of said outer casing so that said inner casing will be shifted within said outer casing by engagement of said face of either of said adjusting members with the opposed face of the inner casing while the other adjusting member is disengaged from the other opposed face of the inner casing or freed for movement within said outer casing by disengagement of said faces of said adjusting members with respect to said faces of said inner casing; and means carried by said outer casing and cooperating with a portion of said inner casing distant from said one side wall thereof for releasably fixing said inner casing in an adjusted position within said outer casing.

9. In an adjustable door closer as recited in claim 8, said means for releasably fixing said inner casing in adjusted position within said outer casing including a pair of supports carried by said outer casing in the interior thereof and formed respectively with a threaded bore; a pair of screws respectively threadedly engaging said threaded bores of said supports; and a pair of slots respectively wider than the shanks of said screws, respectively formed in said inner casing, and through which said screw shanks respectively extend, said screws respectively having heads larger than the width of said slots so that said screws may be turned for pressing the portion of said inner casing having said slots into engagement with said supports so as to releasably fix said inner casing in an adjusted position when said adjusting members within said outer casing abut against said outer faces of said side wall.

References Cited in the file of this patent
UNITED STATES PATENTS

| | | |
|---|---|---|
| 2,544,252 | Carlson | Mar. 6, 1951 |
| 2,820,243 | Gibbons | Jan. 21, 1958 |

FOREIGN PATENTS

| | | |
|---|---|---|
| 179,233 | Austria | July 26, 1954 |